US012428329B2

(12) United States Patent
Soliman et al.

(10) Patent No.: US 12,428,329 B2
(45) Date of Patent: *Sep. 30, 2025

(54) DECOMPOSITION OF GAS FIELD CHEMICALS

(71) Applicant: Saudi Arabian Oil Company, Dhahran (SA)

(72) Inventors: Mohamed Ahmed Soliman, Ras Tanura (SA); Hasan Al Abdulgader, Dammam (SA); Mohamed Ahmed Saad Mahmoud, Dammam (SA); Duaa J. Al Saeed, Al Qatif (SA); Saba El Sharif, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 402 days.

This patent is subject to a terminal disclaimer.

(21) Appl. No.: 17/967,334

(22) Filed: Oct. 17, 2022

(65) Prior Publication Data

US 2024/0124340 A1    Apr. 18, 2024

(51) Int. Cl.
*C02F 9/00* (2023.01)
*B01D 61/00* (2006.01)
(Continued)

(52) U.S. Cl.
CPC ............ *C02F 9/00* (2013.01); *B01D 61/0022* (2022.08); *B01D 61/0024* (2022.08);
(Continued)

(58) Field of Classification Search
CPC .. C02F 9/00; C02F 1/008; C02F 1/445; C02F 1/463; C02F 1/4672; C02F 1/78; C02F 2101/30; C02F 2101/32; C02F 2209/10; C02F 2209/40; C02F 2001/46138; C02F 2001/46142; C02F 5/10; C02F 2101/34; C02F 2101/38; C02F 2103/10; C02F 2103/365; C02F 2201/46115;
(Continued)

(56) References Cited

U.S. PATENT DOCUMENTS 872,832 A     12/1907  Malaby et al.
7,994,374 B2   8/2011  Talley et al.
(Continued)

FOREIGN PATENT DOCUMENTS

CN    106928954     7/2017
CN    108773875    11/2018
(Continued)

OTHER PUBLICATIONS

Golpour et al., "Development of a new nanofiltration membrane for removal of kinetic hydrate inhibitor from water," Separation and Purification Technology, 183, Elsevier, 2017, 48 pages.
(Continued)

*Primary Examiner* — Joseph W Drodge
(74) *Attorney, Agent, or Firm* — Fish & Richardson P.C.

(57) ABSTRACT

A system and a method for removing gas field chemicals from a feed stream are provided. An exemplary method includes performing a forward osmosis on a feed stream including gas field chemicals to form a concentrated feed stream, and treating the concentrated feed stream in an electrochemical process to form treated water.

26 Claims, 11 Drawing Sheets

(51) Int. Cl.
*C02F 1/00* (2023.01)
*C02F 1/44* (2023.01)
*C02F 1/46* (2023.01)
*C02F 1/78* (2023.01)
*C10G 33/00* (2006.01)
*E21B 43/20* (2006.01)
*C02F 1/463* (2023.01)
*C02F 1/467* (2023.01)
*C02F 101/30* (2006.01)
*C02F 101/32* (2006.01)

(52) U.S. Cl.
CPC ........... B01D 61/005 (2013.01); C02F 1/008 (2013.01); C10G 33/00 (2013.01); *B01D 2311/08* (2013.01); *B01D 2311/16* (2013.01); *B01D 2311/2634* (2013.01); *B01D 2311/2642* (2013.01); *B01D 2311/2669* (2013.01); *B01D 2311/2684* (2013.01); *B01D 2313/60* (2022.08); *B01D 2313/70* (2022.08); *C02F 1/445* (2013.01); *C02F 1/463* (2013.01); *C02F 1/4672* (2013.01); *C02F 1/78* (2013.01); *C02F 2101/30* (2013.01); *C02F 2101/32* (2013.01); *C02F 2209/10* (2013.01); *C02F 2209/40* (2013.01); *E21B 43/20* (2013.01)

(58) Field of Classification Search
CPC .......... C02F 2209/001; C02F 2209/003; C02F 2209/006; C02F 2209/02; C02F 2301/04; C02F 2303/16; C02F 2303/18; C02F 2303/22; C02F 1/45; C02F 1/461; C02F 1/467; B01D 61/0022; B01D 61/0024; B01D 61/005; B01D 2311/08; B01D 2311/16; B01D 2311/2634; B01D 2311/2642; B01D 2311/2669; B01D 2311/2684; B01D 2313/60; B01D 2313/70; B01D 61/025; B01D 63/16; B01D 65/08; B01D 61/002; B01D 19/00; B01D 19/0031; B01D 19/0068; B01D 19/0073; B01D 19/0084; B01D 61/0021; B01D 61/0023; B01D 2311/2603; C10G 33/00; E21B 43/20; E21B 21/06; E21B 21/063; E21B 21/067; E21B 43/34; E21B 43/40; C09K 2208/22; C09K 2208/32
See application file for complete search history.

(56) References Cited

U.S. PATENT DOCUMENTS

| | | | |
|---|---|---|---|
| 8,021,553 B2 * | 9/2011 | Iyer | C02F 1/445 |
| | | | 210/636 |
| 8,728,325 B2 | 5/2014 | Hussain et al. | |
| 8,980,798 B2 | 3/2015 | Tian et al. | |
| 9,114,372 B1 | 8/2015 | Lord et al. | |
| 2009/0261040 A1 * | 10/2009 | Pruet | B01D 61/0021 |
| | | | 210/170.11 |
| 2010/0155329 A1 * | 6/2010 | Iyer | C02F 1/445 |
| | | | 210/636 |
| 2010/0224561 A1 | 9/2010 | Marcin et al. | |
| 2013/0075335 A1 * | 3/2013 | Prakash | B01D 61/58 |
| | | | 210/640 |
| 2013/0168315 A1 * | 7/2013 | Minier Matar | C02F 9/00 |
| | | | 210/638 |
| 2014/0151300 A1 * | 6/2014 | Savage | C02F 9/00 |
| | | | 210/639 |
| 2014/0353252 A1 * | 12/2014 | Hester | G06Q 50/06 |
| | | | 210/800 |
| 2016/0158705 A1 * | 6/2016 | Helm | C02F 1/445 |
| | | | 427/140 |
| 2017/0129796 A1 * | 5/2017 | Iyer | B01D 61/0021 |
| 2018/0128250 A1 * | 5/2018 | Iyer | B01D 61/002 |
| 2019/0118114 A1 | 4/2019 | Rithauddeen et al. | |
| 2021/0198136 A1 * | 7/2021 | Jani | B01D 61/029 |
| 2023/0191328 A1 * | 6/2023 | Nocera | B01D 61/005 |
| | | | 210/638 |
| 2023/0311065 A1 | 10/2023 | Soliman | |

FOREIGN PATENT DOCUMENTS

| | | | | |
|---|---|---|---|---|
| GB | 2364380 A * | 1/2002 | ............ | E21B 23/03 |
| GB | 2581365 A * | 8/2020 | ............. | C02F 1/286 |
| WO | WO-2005089913 A1 * | 9/2005 | .......... | B01D 61/002 |
| WO | WO 2012128910 | 9/2012 | | |
| WO | WO 2013093789 | 6/2013 | | |
| WO | WO 2013121217 | 8/2013 | | |
| WO | WO-2016115497 A1 * | 7/2016 | | |

OTHER PUBLICATIONS

Al Hawli et al., "A hybrid electro-coagulation/forward osmosis system for treatment of produced water," Chemical Engineering and Processing: Process Intensification, Aug. 9, 2019, 143(107621):1-8, 8 pages.

International Search Report and Written Opinion in International Appln. No. PCT/US2023/035229, mailed on Jan. 31, 2024, 15 pages.

Sardari et al., "Integrated electrocoagulation—Forward osmosis—Membrane distillation for sustainable water recovery from hydraulic fracturing produced water," Journal of Membrane Science, Dec. 29, 2018, 574:325-337, 13 pages.

* cited by examiner

DECOMPOSITION OF GAS FIELD CHEMICALS

TECHNICAL FIELD

The present disclosure is directed to a process for degrading chemicals used in gas fields.

BACKGROUND

Natural gas hydrates are solid substances that trap hydrocarbons in a solid matrix of water. The hydrates are approximately 85 mol % water, giving similar physical properties to ice. The gas hydrate is a crystalized water lattice or cage that is formed by combining water molecules with low molecular weight gas molecules. In the oil and gas industry, the gas molecules in the lattice structure can include methane, ethane, propane, isobutane, $H_2S$, $CO_2$, or nitrogen. Hydrates can accumulate on inner walls of pipes or fluid receptacles fouling equipment. The fouling can reduce production rates, plug transmission pipelines, or form ice balls that can act as solid projectiles damaging downstream instruments and processes. Therefore, hydrate formation is a significant operational and safety concern.

Hydrate inhibitors, such as kinetic hydrate inhibitors (KHIs), are substances, such as water-soluble polymers, that inhibit the formation of hydrates. For example, KHIs slow the nucleation or growth of hydrate crystals. Thus, treating a fluid stream with a KHI enables fluid streams to pass along a flow path with reduced hydrate formation. Most of the high-performance KHIs have solubility limitations based on temperature and salt content of the water. Generally, the KHIs become less soluble and even precipitate at higher temperatures and salt content of the water phase. Other chemicals in the system, particularly corrosion inhibitors, can also interact with the KHIs. Therefore, the KHI needs to be compatible with other chemicals in the stream.

While hydrate inhibitors slow or prevent the formation of solid hydrates, they are often incompatible with conditions and other chemical found in wells, such as heat and salts. Under these conditions, the hydrate inhibitors can precipitate, damaging formations. Therefore, produced water that has added hydrate inhibitors may not be useful for injection water solutions, increasing the amount of water needed for gas and oil production in fields.

SUMMARY

An embodiment described by examples herein provides a method for removing gas field chemicals from a feed stream. The method includes performing a forward osmosis on a feed stream including gas field chemicals to form a concentrated feed stream, and treating the concentrated feed stream in an electrochemical process to form treated water.

Another embodiment described by examples herein provides a system for removing hydrate inhibitors from produced water. The system includes a forward osmosis (FO) unit that includes a concentrated draw solution feed, a dilute draw solution effluent, a water feed, a concentrated water effluent, and a semipermeable membrane separating the water feed from the concentrated draw solution feed. The system includes an electrochemical purification unit to form a treated water effluent from the concentrated water effluent, and a control system.

DETAILED DESCRIPTION

Figure 1:
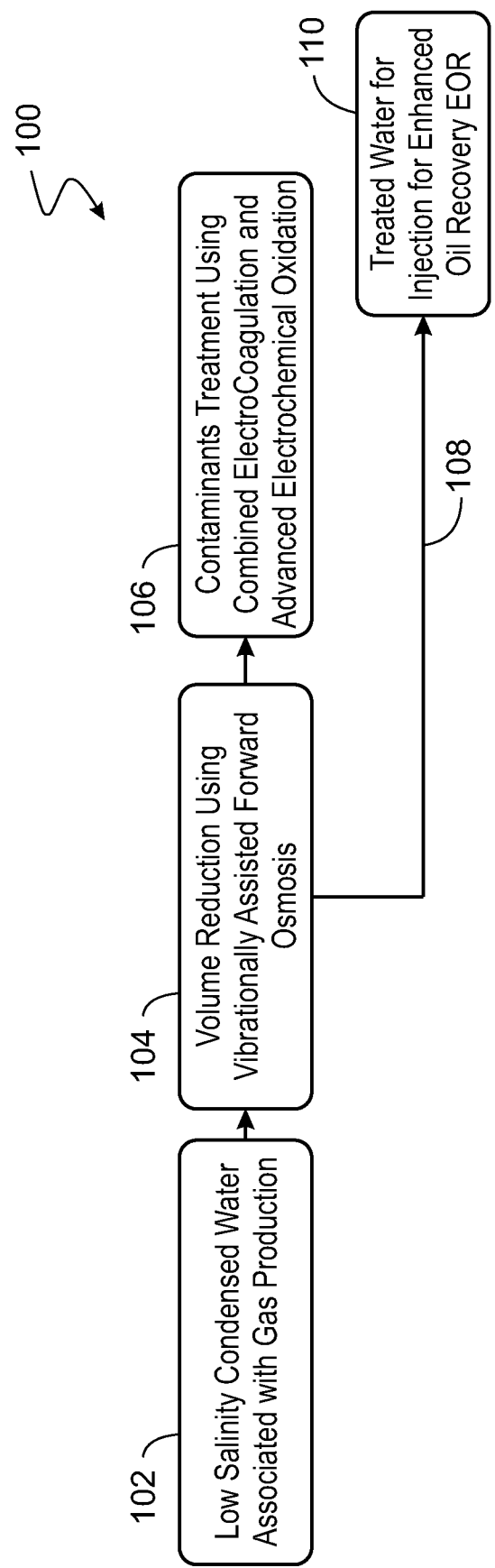
FIG. 1 is a schematic diagram of a single stage process for removing KHI from an associated water stream that uses an FO volume reduction process followed by combined electrocoagulation/electrochemical purification process.

The active part of most commercially available KHI formulations is a synthetic polymer. The most commonly used synthetic polymer is a water miscible poly-n-vinylamide such as polyvinylcaprolactam (PVCap). KHI polymers can be organic, water miscible, or both. Example of polymers that can be used as KHIs include the following polymers or combinations or derivatives thereof: poly(vinylcaprolactam) (PVCap); polyvinylpyrrolidone; poly(vinylvalerolactam); poly(vinylazacyclooctanone); co-polymers of vinylpyrrolidone and vinylcaprolactam; poly(N-methyl-N-vinylacetamide); copolymers of N-methyl-N-vinylacetamide and acryloyl piperidine; co-polymers of N-methyl-N-vinylacetamide and isopropyl methacrylamide; co-polymers of N-methyl-N-vinyl acetamide and methacryloyl pyrrolidine; copolymers of acryloyl pyrrolidine and N-methyl-N-vinylacetamide; acrylamide/maleimide co-polymers such as dimethylacrylamide (DMAM) copolymerized with, for example, maleimide (ME), ethyl maleimide (EME), propyl maleimide (PME), or butyl maleimide (BME); acrylamide/maleimide co-polymers such as DMAM/methyl maleimide (DMAM/MME) and DMAM/cyclohexyl maleimide (DMAM/CHME); N-vinyl amide/maleimide co-polymers such as N-methyl-Nvinylacetamide/ethyl maleimide (VIMAlEME); lactam maleimide co-polymers such as vinylcaprolactam ethylmaleimide (VCap/EME); polyvinyl alcohols; polyamines; polycaprolactams; or polymers or co-polymers of maleimides, or acrylamides. As described herein, KHIs can precipitate at high temperatures, or high salt concentrations, which may cause formation damage or equipment fouling.

Techniques described in examples herein provide methods and systems for removing and degrading the kinetic hydrate inhibitors (KHI), and other gas chemicals, to reduce the possibility of formation blockage resulting from the precipitation of the KHIs at high temperature or salinity in downhole. The provided techniques use a two-step process including volume reduction of waste streams containing KHI, such as gas field water, by forward osmosis (FO). The waste streams are produced in conjunction with natural gas production, and are termed "associated water" herein. The concentrated water produced through volume reduction of the associated water is then treated by electrocoagulation and electrochemical oxidation/reduction, which degrades the KHIs and other wastes. The treated water that is generated can be used for enhanced oil recovery (EOR), as wash water for a crude oil desalting operation, as a base aqueous fluid for oil field operations, or disposed of through an injection well.

The FO process uses a draw solution, for example, having a high concentration of salts, to create a high osmotic pressure differential across a membrane. Examples of the draw solutions include concentrated ammonium chloride solutions, produced water from oil fields, and the like. The high osmotic pressure draws water from a low concentration side of the membrane, for example, including the associated water, to the high concentration side of the membrane, diluting the draw solution. This concentrates the associated water, making the degradation of the KHIs easier.

The FO process may be vibration-assisted to reduce membrane fouling. The vibration produces shear waves that decrease stagnation and fouling. The treated water is low salinity and can be used for enhanced oil recovery.

The electrochemical treatment of gas condensed water technology is used to treat the associated water that KHI, oil, suspended solids and other chemicals that is usually discarded. This provides an alternative resource for groundwater that is used for pressure maintenance.

Thus, the techniques remove and decompose gas field chemicals such as KHI that can damage the formation or cause incompatibility when mixed with other chemicals. Further, the removal of the KHI will reduce the precipitation of the KHI at valves, pumps, and heat exchangers inside the gas oil separation plant.

FIG. 1 is a schematic diagram of a single stage process 100 for removing KHI from an associated water stream that uses an FO volume reduction process followed by a combined electrocoagulation/electrochemical purification process. As used herein, an electropurification process purifies a feed stream by any combinations of the flotation of contaminants with hydrogen bubbles, electrocoagulation of contaminates with metal ions, or through electrooxidation/electroreduction of contaminants. The associated water 102 is passed to the FO process 104 for volume reduction. As described herein, the associated water 102 can be produced from low or no salinity water that is condensed from water vapor in a gas stream or separated as entrained water droplets from the gas stream.

The draw solution may include ammonium chloride, produced water, and the like. In some embodiments, the draw solution is high salinity water from production traps on the gas-oil separation plant, such as produced water from oil fields. The FO process produces a concentrated water solution from the associated water 102 that has an increased concentration of the hydrate initiators. The hydrate initiators are degraded in the electrochemical purification process 106, generating the treated water 110.

The FO process 104 also produces a purified water stream 108 from the regeneration of the draw solution. In some embodiments, the purified water stream is combined with the treated water stream from the electropurification process 106 to form the treated water 110. As described herein, the treated water 110 can be used for enhanced oil recovery, or as a wash solution in a desalination process, among others.

Figure 2:
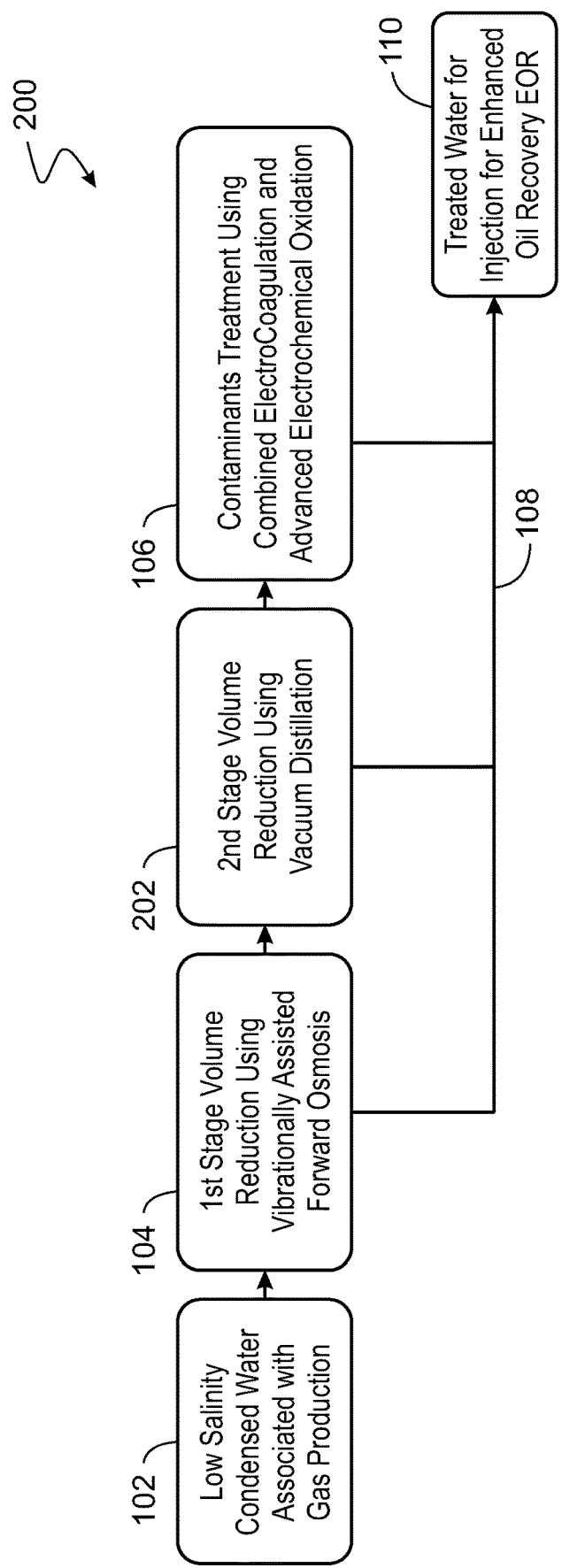
FIG. 2 is a schematic diagram of a two-stage process for removing KHI from an associated water stream that uses an FO volume reduction process, followed by vacuum distillation, and then a combined electrocoagulation/electrochemical purification process.

FIG. 2 is a schematic diagram of a two-stage process 200 for removing KHI from an associated water stream that uses an FO volume reduction process, followed by vacuum distillation, and then a combined electrocoagulation/electrochemical purification process. Like numbered items are as described with respect to FIG. 1.

In this embodiment, a distillation process 202 is used to further concentrate the concentrated water before the electrochemical purification is performed. In some embodiments, the distillation process 202 includes a vacuum distillation process. The distillation process 202 produces a purified water stream 108. In some embodiments, the purified water stream from the distillation process 202 is combined with the treated water stream 108 from the electrocoagulation/electrochemical purification process 106 and the purified water stream from the regeneration of the draw solution in the FO process 104 to produce the treated water 110.

Figure 3:
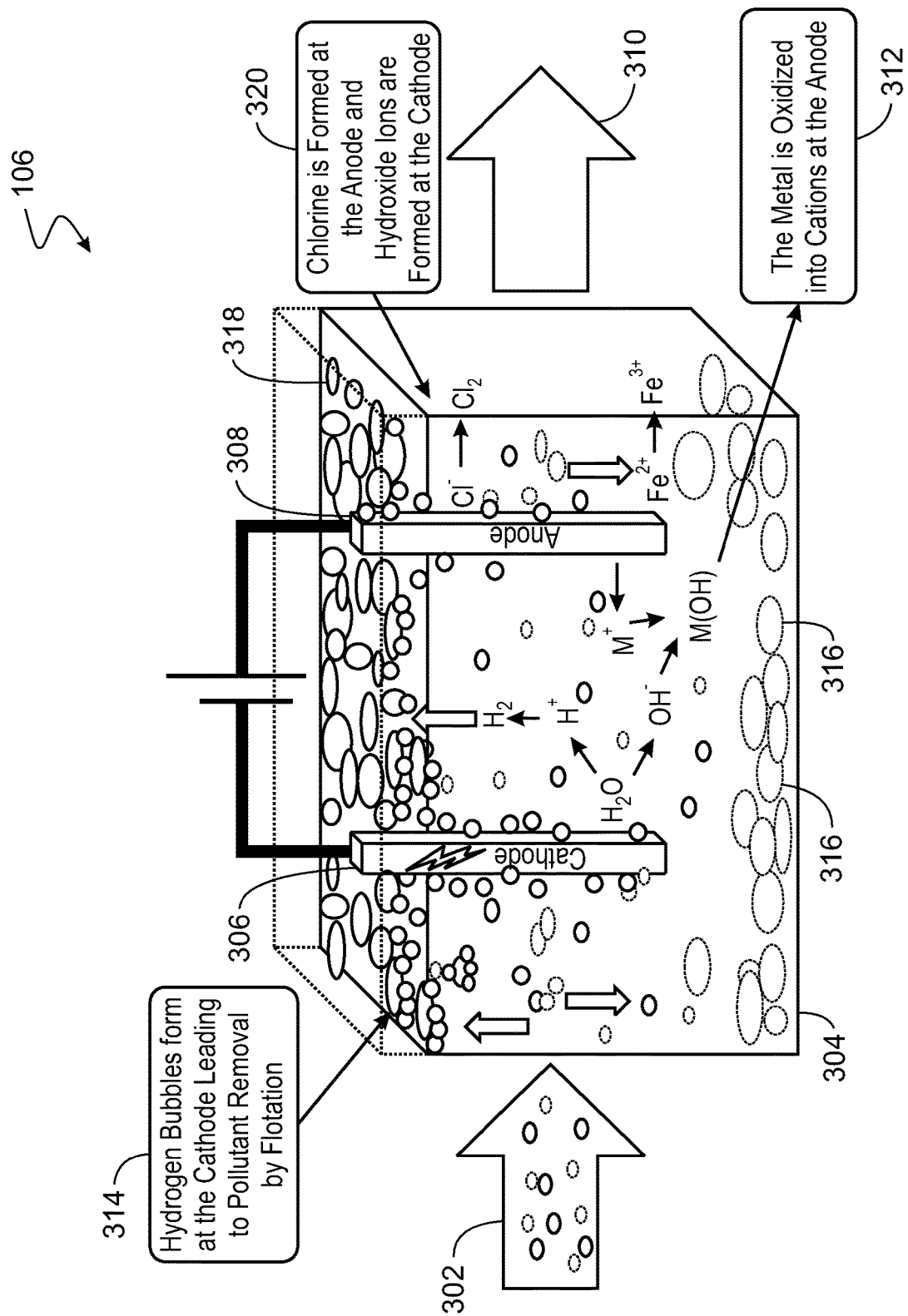
FIG. 3 is a schematic drawing of the combined electrocoagulation and electrochemical oxidation process.

FIG. 3 is a schematic drawing of the combined electrocoagulation and electrochemical oxidation process 106. In the process 106, the concentrated water 302 from the FO process, or from the vacuum distillation process, is passed into an electropurification unit 304 that includes a cathode 306 and an anode 308. The current passing between the electrodes 306 and 308, which may perform three functions, flotation of contaminants, electrocoagulation, and electrochemical purification, forming the treated water 310.

In the electrocoagulation process, electricity is conducted into water that has a high ionic concentration to drive chemical reactions that will help in reducing the concentration of dissolved and emulsified oil, KHI, other gas field chemicals and suspended solids, for example, by flotation and agglomeration. The electrocoagulation reactions at the anode 308 include the oxidation of metals with the release of electrons, as shown in equation 1.

$$M \rightarrow M^{z+} Ze^{-} \quad \text{EQN. 1}$$

Another reaction is the oxidation of chloride ions, as shown in equation 2:

$$2Cl^{-} \rightarrow Cl_2 + 2e^{-} \quad \text{EQN. 2}$$

Depending on the pH, one of the following reactions will take place. Under acidic conditions, the reaction in equation 3 will take place at the anode, while the reaction equation 4 will take place under basic conditions.

$$Cl_2 + H_2O \rightarrow HOCl + Cl^{-} + H^{+} \quad \text{EQN. 3}$$

$$HClO \rightarrow + H^{+} + ClO^{-} \quad \text{EQN. 4}$$

The electrocoagulation reactions at the cathode include the electrolysis of water to form hydrogen, as shown in equations 5 and 6.

$$H_2O + 3e^{-} \rightarrow 3/2 H_2 + 3OH^{-} \quad \text{EQN. 5}$$

$$M^{z+} + ZOH^{-} \rightarrow M(OH)_z \quad \text{EQN. 6}$$

The expected reactions can be used to choose the materials used for the electrodes, for example, to enhance the purification process. Choosing an electrode material for electrocoagulation is based on enhancing the precipitation or flotation of impurities.

Aluminum and iron are generally used to generate coagulants in-situ in electrocoagulation, for example, as sacrificial electrodes. Both of these metals are low cost, readily available, and have been proven effective in the treatment of wastewater. Generally, aluminum electrodes are used for batch operations as the formation of an aluminum oxide coating ensures that the aluminum electrodes are stable when the power is off. Iron electrodes are preferred for continuous operations, as the iron electrodes continue to corrode when they are disconnected from the power. Other metals may be used for the electrodes in, such as copper and zinc, among others.

As the electricity passes through produced water, a number of reactions, both electrochemical and otherwise, take place. If sacrificial electrodes are used, metal cations are formed 312 at the anode, and hydrogen gas and hydroxyl radicals are formed 314 at the cathode. The metal cations react with the hydroxyl radicals to form metal hydroxides and polyhydroxides. These compounds will work as coagulants, and help to destabilize contaminates present in water, forming precipitants 316. In addition, the hydrogen gas formed at the cathode 306 may help in removing lighter contaminants by flotation. In some embodiments, a weir, or skimmer, is placed at the top of the electropurification unit 304 to remove floating contaminants 318.

If non-sacrificial electrodes are used, such as platinum or nickel electrodes, among others, chloride ions present in the water are oxidized 320 to form chlorine species, which can be used for disinfection or as oxidants. The dissolved organics present in produced water may be oxidized directly by the anode or indirectly oxidized by the chlorine species generated during the electrochemical treatment process, or both.

In some embodiments, both sacrificial and non-sacrificial electrodes are used. For example, multiple anodes may be used wherein some of the anodes are sacrificial and some of the anodes are non-sacrificial. The same thing may be done for the cathodes.

Figure 4:
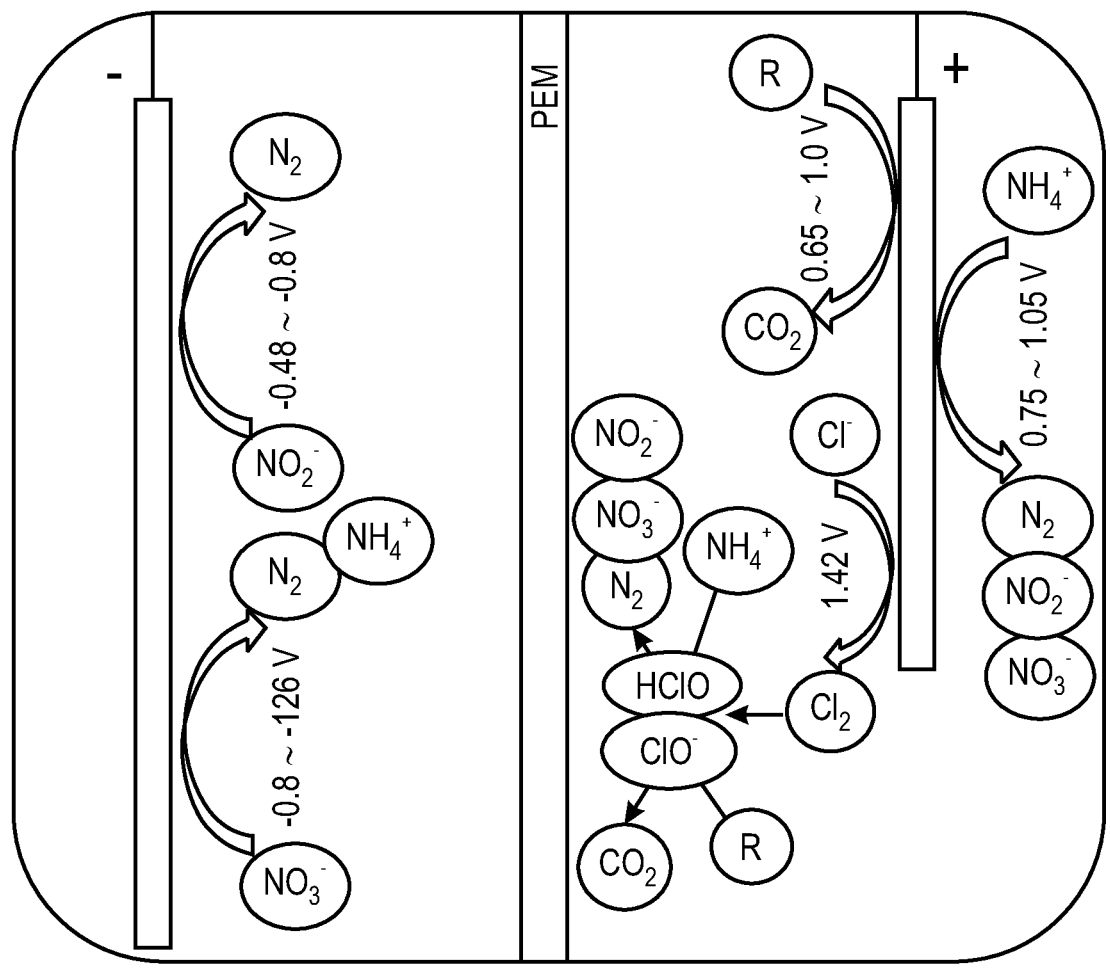
FIG. 4 is a schematic diagram of a sample of direct and indirect electrochemical oxidation and reduction reactions of inorganic and organic compounds that may be present.

FIG. 4 is a schematic diagram of a sample of direct and indirect electrochemical oxidation and reduction reactions of inorganic and organic compounds that may be present. The figure also shows the overpotential required for direct oxidation or reduction in a membrane-divided cell.

Electrochemical oxidation of organic compounds is governed by two main mechanisms, direct and indirect oxidation. The indirect method involves the formation of chlorine species. If the water contains chloride ions, then, chlorine gas can be generated at the anode according to the following reactions:

$$H_2O \rightarrow O_2 + 4H^+ + 4e^- \quad E°=1.23 \text{ V/ENH} \qquad \text{EQN. 7}$$

$$2Cl^{-1} + 2e^- \rightarrow Cl_2 \quad E°=1.36 \text{ V/ENH} \qquad \text{EQN. 8}$$

$$H_2O + Cl_2 \rightarrow HClO + H^+ + Cl^- \qquad \text{EQN. 9}$$

Depending on the pH, chlorine species such as chlorine, hypochlorous acid, and hypochlorite may be present. Under basic conditions, the following reaction takes place:

$$HClO \rightarrow H^+ + ClO^- \qquad \text{EQN. 10}$$

If bromide is present, the following reactions may take place:

$$HClO + Br^- \rightarrow HOBr + Cl^- \qquad \text{EQN. 11}$$

$$ClO^- + Br^- \rightarrow BrO^- + Cl^- \qquad \text{EQN. 11}$$

At the cathode, water will decompose into hydrogen gas and hydroxyl ions as follows:

$$3H_2O + 3e^- \rightarrow 3/2 H_2 + 3\ OH^- + Cl^- \quad E°=0 \text{ V/ENH} \qquad \text{EQN. 13}$$

The hydroxide ions are highly active, which will result in the formation of metal oxides. Another possible reaction for the formation of hypochlorous acid in water can be written as:

$$H_2O + Cl^- \rightarrow HClO + H^+ + 2e^- \qquad \text{EQN. 14}$$

Direct oxidation products of organics (R) may include the following: RO, $CO_2$, $NH_3$, and $H^+$. This method requires active oxygen to be in direct contact with the organics. This is performed using an electrode with a catalytic coating.

The selection of the electrode material used for electro-oxidation can be based on the contaminants to be removed. The degradation of organic and inorganic compounds usually takes place at high potentials at which oxygen evolution is the main competitive reaction. Thus, a material with high oxygen overpotential is selected for the degradation. In some embodiments, noble materials such as platinum (Pt) and palladium (Pd) are used as they show high performance in terms of contaminants removal. However, these metals tend to have a low oxygen evolution potential and have a high cost.

Thus, different metals may be selected for the electrodes to address this. In some embodiments, the metals used for the electrodes include titanium-based electrodes coated with iridium and or ruthenium oxide, and boron doped diamond (BDD) electrodes, among others. Metal electrodes coated with metal oxides are typically referred to as mixed metal oxide (MMO) electrodes. MMO are commercially known as dimensionally stable electrodes. If dimensionally stable electrodes are used rather than sacrificial iron and aluminum electrodes, then the main mechanisms for contaminates removal are electrochemical oxidation by direct or indirect oxidation, and flotation by the generation of hydrogen. The coating on the electrodes with metal oxides or catalysts help in improving the selectivity of electrochemical oxidation reactions.

As noted above, multiple electrodes may be used for both the anode and the cathode, wherein some of the electrodes are optimized for electro-oxidation and some are optimized for electrocoagulation. For example, a sacrificial electrode may be used as an anode in parallel with a dimensionally stable anode.

Figure 5:
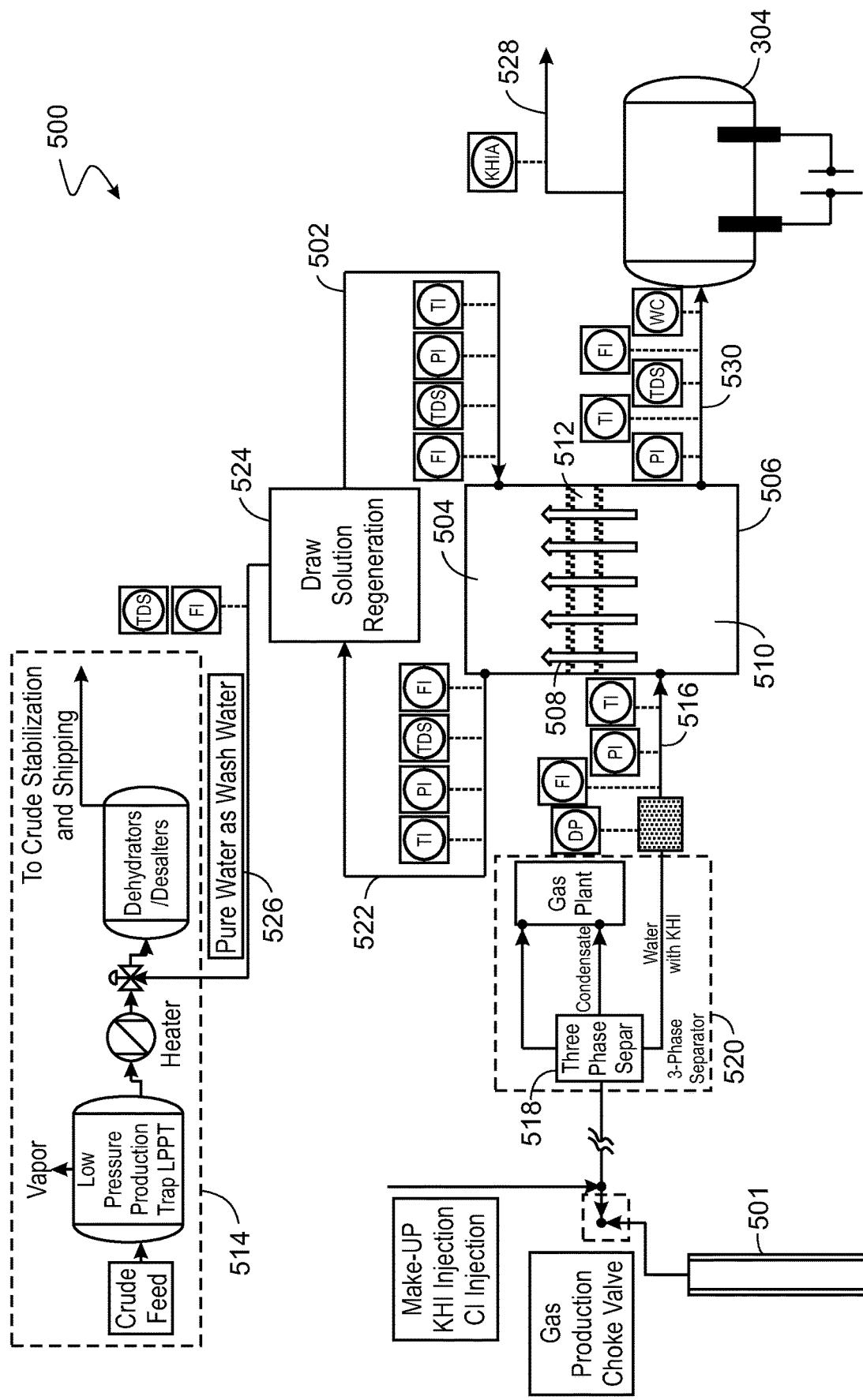
FIG. 5 is a schematic diagram of a system for the concentration and decomposition of a hydrate inhibitor using forward osmosis (FO) and electrochemical coagulation and decomposition.

FIG. 5 is a schematic diagram of a system 500 for the concentration and decomposition of a hydrate inhibitor using forward osmosis (FO) and electrochemical coagulation and decomposition. Like numbered items are as described with respect to FIG. 3. Gas produced from a well 501 often has entrained water, which, as discussed herein, can form clathrate hydrates. Hydrate inhibitors, such as kinetic hydrate inhibitors, are often added to slow or prevent the formation of hydrates.

A concentrated draw solution 502 is fed to a draw chamber 504 of a forward osmosis (FO) unit 506, which extracts water 508 from a feed chamber 510 of the FO unit 506. The extraction is driven by an osmotic pressure differential across a semipermeable membrane 512 between the draw chamber 504 and the feed chamber 510 caused by the higher concentration of salts in the draw chamber 504. The semipermeable membrane 512 rejects most solutes.

Sensors are positioned along the lines to monitor the operation of the system 500. For clarity of the schematic diagram, the sensors are not labeled with reference numbers. The sensors include temperature indicators (TI), pressure indicators (PI), flow indicators (FI), and differential pressure indicators (DP). Analyzers are also included to monitor the operation of the system 500. These include total dissolved solids analyzers (TDS), water content analyzers (WC), and KHI analyzers (KHIA), among others. In some embodiments, the KHI analyzers include more generic hydrate inhibitor analyzers.

The selection and use of a suitable draw solute can greatly influence the efficiency and sustainability of FO operations. Typically, an ideal draw solute in FO for water production should have the desired properties of high osmotic pressure, minimal reverse solute diffusion, easy separation from water, economic feasibility, reusability, nontoxicity, and compatibility with the semi permeable membrane 512. In some embodiments, the concentrated draw solution 502 is a solution of ammonium chloride, produced water from a gas oil separation plant (GSOP) 514, or another type of solution such as a switchable polarity solvent.

Other draw solutions can include ionic compounds, such as KCl, $CaCl_2$, NaCl, $MgCl_2$, ammonia-carbon dioxide ($NH_4HCO_3$), ammonium nitrate, ammonium chloride, or organic materials such as switchable polarity solvents (SPS). Switchable Polarity Solvents (SPS) have a low polarity until exposed to a trigger, which changes them to a high polarity solvent. In embodiments described herein, the trigger is $CO_2$, which reacts with the molecule to produce a water-miscible form. Treating the SPS with nitrogen will force out the $CO_2$, causing the SPS to no longer be water miscible and allowing phase separation of the purified water.

In the embodiment of system 500, the concentrated draw solution 502 is used to concentrate and absorb the water from the feed solution 516 (water separated from the three-phase separator in the gas plant) using forward osmosis through the semipermeable membrane 512. The extraction of the water 508 across the semi permeable membrane 512 generates a dilute draw solution 522 that can be treated, or disposed of, in a number of techniques. For example, in the system 500 of FIG. 5, a draw solution regenerator 524 can be used to regenerate the concentrated draw solution 502. A purified water stream 526 is generated during the regeneration process, which may be provided back to the GOSP 514 as a wash solution during desalination. In some embodiments, the purified water stream 526 is injected into a well for pressure maintenance, for example, in a mixture with treated water 528 produced by the electrochemical purification unit 304.

In various embodiments, the regeneration process in the draw solution regenerator 524 is a thermal process that uses distillation or vacuum distillation to remove the water as a purified water stream 526, reforming the concentrated draw solution 502. In other embodiments, the regeneration process is a reverse osmosis process, a nanofiltration process, or a microfiltration process.

The concentrated draw solution 502 from the draw solution regenerator 524 is then returned to the FO unit 506 to repeat the process, absorbing the water from the feed solution 516. The concentrated feed solution 530 containing KHI and other gas field chemicals is significantly reduced in volume. This makes the use of electropurification to decompose the chemicals more efficient.

The techniques are not limited to using a draw solution regenerator 524, as the dilute draw solution 522 can be disposed of without regeneration. For example, produced water is collected from various equipment of the GOSP 514 and then treated in a water oil separation plant (WOSEP) to lower the oil content to less than 100 ppm. In some embodiments, the treated produced water is then used as the concentrated draw solution 502 to extract the water 512 from the feed solution 516 across the semipermeable membrane 512. The dilute draw solution 522 can then be reinjected into the gas reservoir to maintain pressure, injected into an oil reservoir for enhanced oil recovery, or injected into a disposal well. In some embodiments, the dilute draw solution 522 can be treated for other uses, such as watering crops and the like.

The feed solution 516 is water that includes the hydrate inhibitors, such as KHI, which has been separated from the three-phase separator 518 in the gas plant 520. The semipermeable membrane 512 is selected to have small pores through which that water molecules from the feed solution 516 can pass freely through the semipermeable membrane 512, while preventing the passage of solute molecules, such as the KHI or other chemicals. In various embodiments, the semipermeable membrane 512 is a flat membrane, a spiral wound membrane, a tubular membrane, or combinations thereof. The tubular membrane can have a cross section selected from circular, square, rectangular, and triangular. The tubular membrane can include hollow membranes. In some embodiments, the semipermeable membrane is a spiral wound membrane. In at least one embodiment, the semipermeable membrane is a tubular membrane containing hollow fibers.

The semipermeable membrane 512 can be constructed from organic materials, minerals, or ceramic materials. In various embodiments, the semipermeable membrane 512 is made from organic materials, such as cellulose acetate, cellulose nitrate, polysulfone, polyvinylidene fluoride, polyamide, and acrylonitrile copolymers, among others. In various embodiments, the semipermeable membrane 512 is made from a mineral or ceramic material that includes C—Al—O, ZrO, $TiO_2$, or a mixed oxide of $SiO$, and Al—O or $ZrO_2$. The semipermeable membrane 512 can be a composite of organic materials with mineral or ceramic materials. The semipermeable membrane 512 can be designed for the specific application, for example, based on the expected solids and other contaminates expected to be present in the water. The semipermeable membrane 512 can include a feed side and a draw side.

In forward osmosis, the water 508 from low-concentration solution permeates and moves through the semipermeable membrane 512 toward the concentrated draw solution 502, which has a higher osmotic pressure. In an embodiment, the forward osmosis membranes is a thin film composite membrane commercially available from Hydration Technology Innovations (HTI) of Albany, OR, USA. For example, the thin film composite membrane is a high permeability, high rejection membrane, and is pH tolerant in a 2.0 to 12.0 range. It can be used in pressure retarded osmosis (PRO) operating conditions. The flat sheet flux of production membranes averages 20 LMH (liters per meter per hour) in FO (forward osmosis) mode and 49 LMH in PRO mode at a test condition of 1 M NaCl as draw solute and DI (deionized) water as feed solution at 23° C. and a CFV (cross flow velocity) of 30 cm/sec. The product is also tested at a power rating of 3.5 $W/m^2$ for PRO at 10° C. at 150 psi. Other FO membranes are available from Lenntech of Delgauw, The Netherlands, Sterlitech of Auburn, WA, USA, or any number of other suppliers. An example of operating pressure and temperature ranges are shown in Table 1.

TABLE 1 operating pressure and temperature ranges for a commercial FO membrane.

|  | Pressure Range, psig (kPa) | Temperature Range, ° F. (° C.) |
|---|---|---|
| Discharge of High Pressure Disposal water Pumps | 2000-3200 (14,000-22,000) | 70-150 (21-66) |
| KHI & Chemical Storage | 0-5 (0-34) | 60-120 (16-49) |
| Feed Solution | 5-200 (34-1400) | 60-120 (16-49) |
| Draw Solution | 5-200 (34-1400) | 70-150 (21-66) |

As used herein, the osmotic pressure is the minimum pressure that needs to be applied to a solution to prevent the inward flow of its pure solvent across a semipermeable membrane. For an ideal solution, the relationship between the osmotic pressure of a solution and the molar concentration of its ions is provided in equation 15.

$$\pi = CRT \qquad \text{EQN. 15}$$

In equation 15, $\pi$ is the osmotic pressure, C is the molar concentration of the ions in the solution in mol/liter, R is the universal gas constant (0.08206 L atm mol-1 K-1), and T is the temperature on the Kelvin scale. The flux, or water transport through the membrane, is a function of differential pressure. The flux can be calculated as shown in equation 16.

$$J_w = K_W(\Delta P - \Delta \pi) \qquad \text{EQN. 16}$$

In equation 16, $J_W$ is the rate of water passage through the membrane, $K_W$ is the permeability coefficient for water for a particular membrane, including area and thickness, $\Delta P$ is the hydraulic pressure differential, and $\Delta \pi$ is the osmotic pressure differential. An example of the results across a membrane are shown in Table 2.

Table 2 is the production rate at different osmotic pressures.

|  | Produced Water | Condensed Water vapor |
|---|---|---|
| Total Dissolved Solid, ppm | 125,000-280,000 | 0-35,000 |
| Osmotic Pressure ranges, psig | 1,700-4,100 at 170 F. | 0-420 at 100 F. |

Higher efficiency and reduced fouling in the forward osmosis can be achieved by the use of vibration assistance for the semipermeable membrane 512. The vibration generates shear stress on the surface of the semipermeable membrane 512 when the semipermeable membrane 512 is vibrating using various modules such as rotating disks sonic transducers, and the like. The shear stress will reduce fouling in forward osmosis and induce a boundary layer disturbance, which mitigates concentration polarization effects, increasing the efficiency of the transfer of water across the semipermeable membrane 512. The semipermeable membrane 512 can be a vibrating flat sheet membranes, or a vibrating hollow fiber membrane. Systems are commercially available as Vibratory Shear Enhanced Process (VSEP) membranes, for example, from the membrane vendor listed above.

Figure 6:
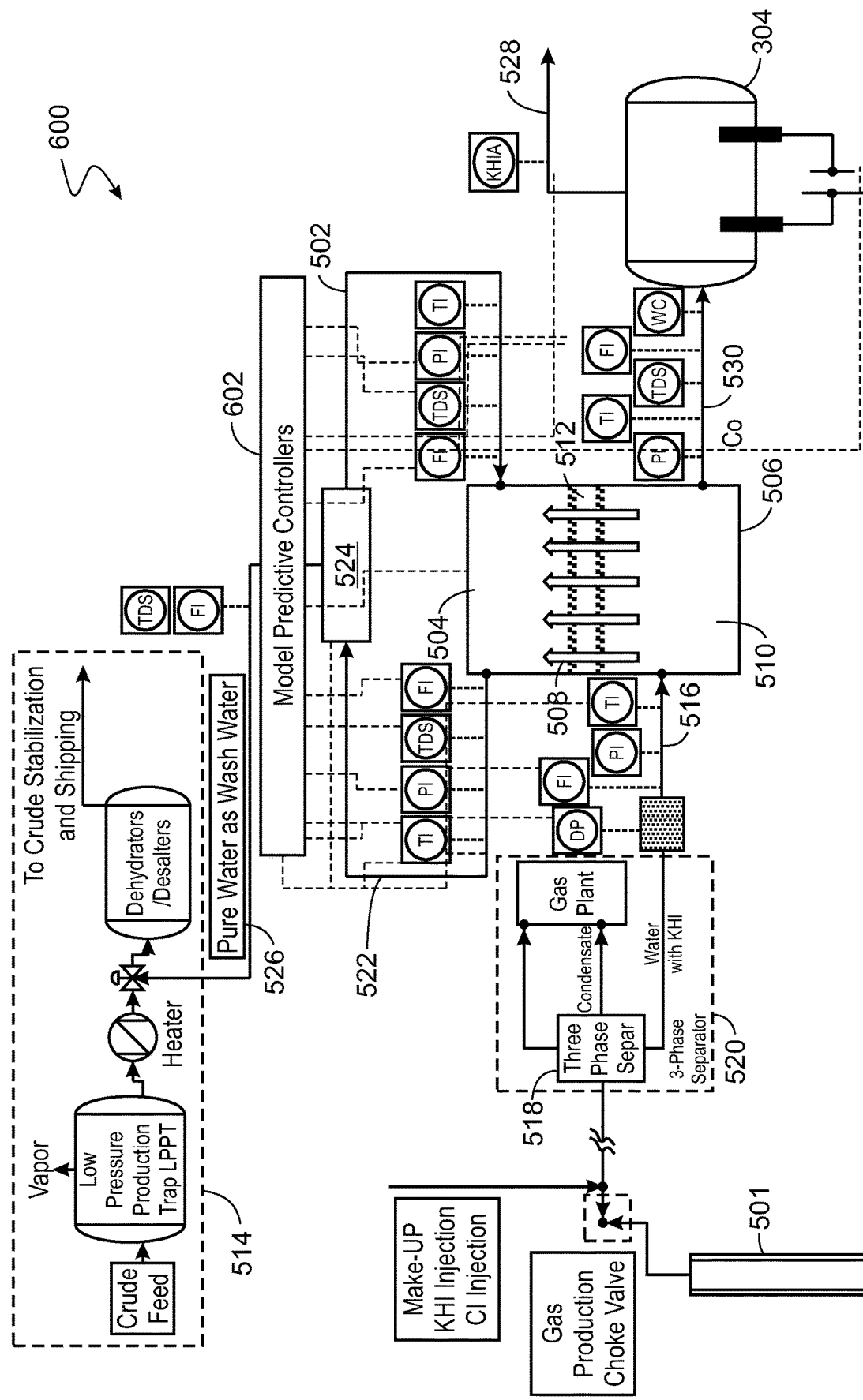
FIG. 6 is a schematic diagram of a system for the concentration and decomposition of a hydrate inhibitor using forward osmosis (FO) and electrochemical coagulation and decomposition using a model predictive controller (MPC).

FIG. 6 is a schematic diagram of a system 600 for the concentration and decomposition of a hydrate inhibitor using forward osmosis (FO) and electrochemical coagulation and decomposition using a model predictive controller (MPC) 602. Like numbered items are as described with respect to FIG. 5. The MPC 602 is discussed further with respect to FIG. 11.

The objective function of the MPC 602 is the maximization of the decomposition of the KHI, and other gas field chemicals, while minimizing the water content in the KHI stream to a KHI storage vessel. The MPC 602 implements a closed loop controller, for example, in a distributed control system (DCS), where the target parameters are a minimum TDS and a maximum for the water content of the concentrated feed solution 530 from the outlet of the FO unit 506. Further, the target parameters can include a minimum in the KHI in the water from the electrochemical purification unit 304.

To reach these targets controlled variables would include the temperature, pressure, and flow, of the feed solution 516. Further controlled variables would include the temperature, pressure, and flow, of the concentrated draw solution 502. The TDS, temperature, pressure, flow, and water content of the concentrated feed solution 516, and the TDS, temperature, pressure, and flow of the dilute draw solution 522. On each of the lines, a flow control valve coupled to the flow indicators (FI) is used to control the flow. In addition to the solution parameters, the MPC 602 can control the power input to the electropurification unit 304.

Two prediction models for the above process variables can be used. These predictive models can use mechanistic modelling or heuristic modelling, for example, by training an artificial intelligence (AI) model with the historical data. The MPC 602 will be used to control the process variables to maximize the decomposition of KHI and other chemicals with low water concentration. It will also be used to predict the performance of the FO unit 506 and electropurification unit 304 to determine whether maintenance is needed.

Generally, using the MPC 602, the TDS of the concentrated feed solution 530 will be monitored to determine any ingress of salts from the draw solution. Further, the TDS across the semipermeable membrane 512 for both draw and feed stream inlet and outlet streams 502, 522, 516, and 530 will be monitored to measure and monitor the performance to of the FO unit 506. The water concentration (WC) in the concentrated feed solution 503 from the FO unit 506 will be utilized to monitor and control the performance of the FO unit 506 by increasing or decreasing the flow of the concentrated draw solution 502 to the FO unit 506. The WC will be utilized to measure the chemical concentration. The KHI analyzer from the electropurification will be used to monitor the performance of the electrocoagulation and electrochemical degradation processes and adjust the power to the electropurification unit 304, flow rates, and the like to minimize the KHI in the treated water 528.

Figure 7:
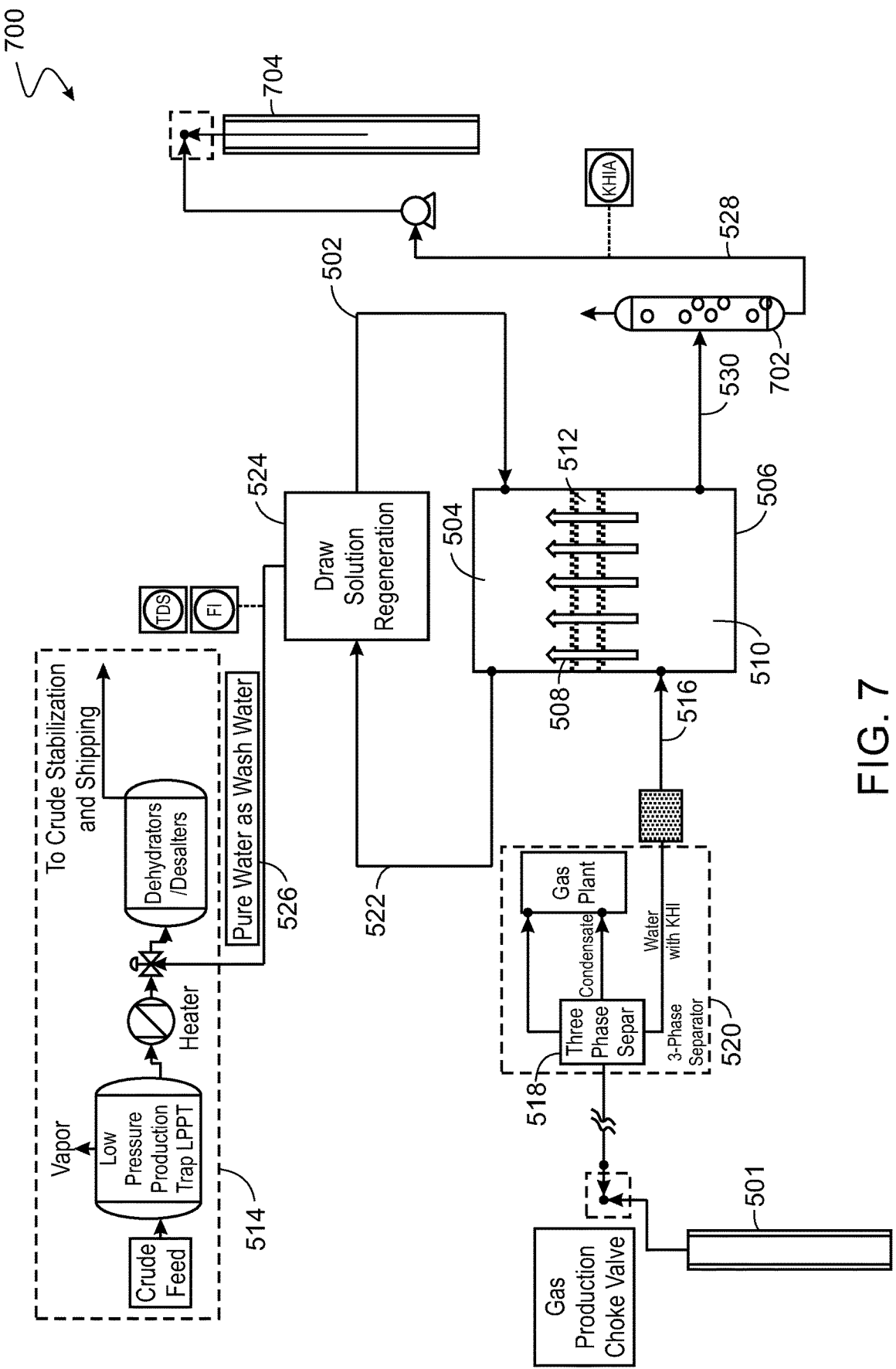
FIG. 7 is a schematic diagram of a system for the concentration and decomposition of a hydrate inhibitor using forward osmosis (FO) and ozonolysis.

FIG. 7 is a schematic diagram of a system 700 for the concentration and decomposition of a hydrate inhibitor using forward osmosis (FO) and ozonolysis. Like numbered items are as described with respect to FIG. 5.

In this system 700, the concentrated feed solution containing the gas field chemicals, including the KHI, are treated in an ozonation unit 702 to decompose the gas field chemicals. In the ozonation process, ozone is bubbled through the concentrated feed solution 530 forming the treated water 528. The ozonation unit 702 may be a tank, or other water storage container.

The ozonation is allows different organic compounds such as KHI, oil, and other gas field chemicals present in untreated water to be oxidized, through the generation of hydroxyl radicals (·OH). In some embodiments, the ozone gas is generated by passing an electrical spark through oxidation. This forms the ozone molecules, which contain three oxygen atoms. In contact with the organic compounds, the ozone degrades into oxygen, binding the third ozone atoms to the organic compound. The oxidation can result in the formation of carbon dioxide and other degradation products. The water can be used for water injection through an injection well 704 without the issue of incompatibility when mixed with other water or formation blockage.

Figure 8:
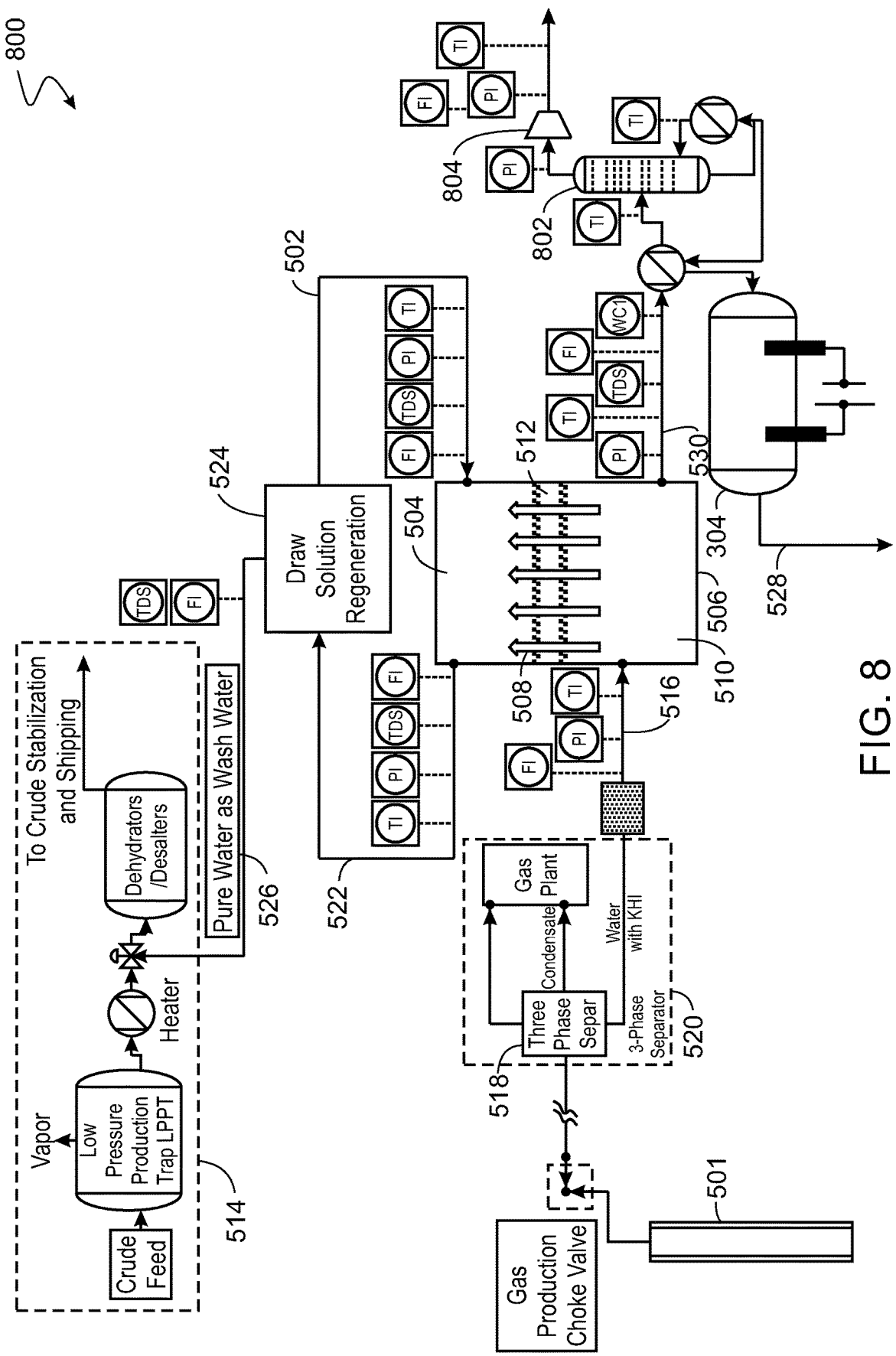
FIG. 8 is a schematic diagram of a system for the concentration and decomposition of a hydrate inhibitor using forward osmosis (FO), vacuum distillation, and electrochemical purification.

FIG. 8 is a schematic diagram of a system 800 for the concentration and decomposition of a hydrate inhibitor using forward osmosis (FO), vacuum distillation, and electrochemical purification. Like numbered items are as described with respect to FIGS. 3 and 5. In this embodiment, the concentrated feed solution 530 is fed, at least in part, to a vacuum distillation tower 802 for further concentration prior to electrochemical purification. In addition to the further removal of water from the concentrated feed solution 530, other volatile components, such as low carbon number hydrocarbons, can be removed from the concentrated feed solution 530. In various embodiments, the vacuum distillation tower 802 is operated at 1.0 to 13.0 psia to reduce the operating temperature, for example, using a vacuum compressor 804, avoiding the potential degradation of the hydrate inhibitors prior to the electrochemical purification unit 304.

Figure 9:
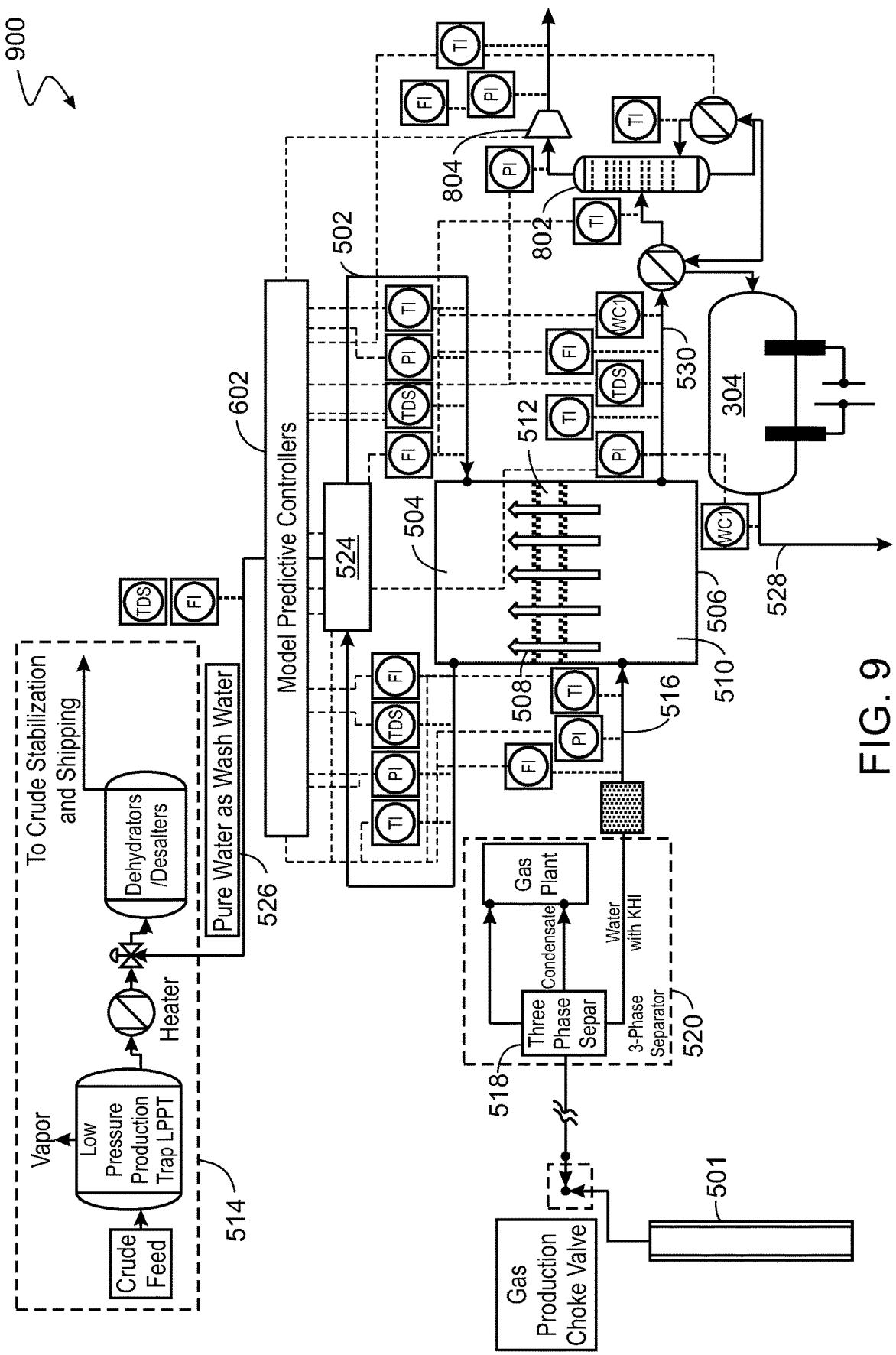
FIG. 9 is a schematic diagram of a system for the concentration and decomposition of a hydrate inhibitor using forward osmosis (FO), vacuum distillation, and electrochemical purification using a model predictive controller (MPC).

FIG. 9 is a schematic diagram of a system 900 for the concentration and decomposition of a hydrate inhibitor using forward osmosis (FO), vacuum distillation, and electrochemical purification using a model predictive controller (MPC) 602. Like numbered items are as described with respect to previous figures. The MPC 602 is discussed further with respect to FIG. 11. In this embodiment, the MPC 602 is used in a similar manner to that discussed with respect to FIG. 6.

The addition of the vacuum distillation tower 802 provides further control over the concentration of the concentrated feed solution 530 from the FO unit 506 before feeding the concentrated feed stream 532 the electropurification unit 304. The water concentration is used to monitor the chemical concentration of the concentrated feed solution 530 and the treated water 528. Along with the other control parameters discussed with respect to FIG. 6, these concentrations are used to control the amount of the concentrated feed solution 530 that is sent to the vacuum distillation tower 802 versus the amount of the concentrated feed solution 530 that is sent directly to the electropurification unit 304. After concentration in the vacuum distillation tower 802, the more highly concentrated feed solution 530 is then returned to the electropurification unit 304 for electrocoagulation and electrochemical decomposition.

Figure 10:
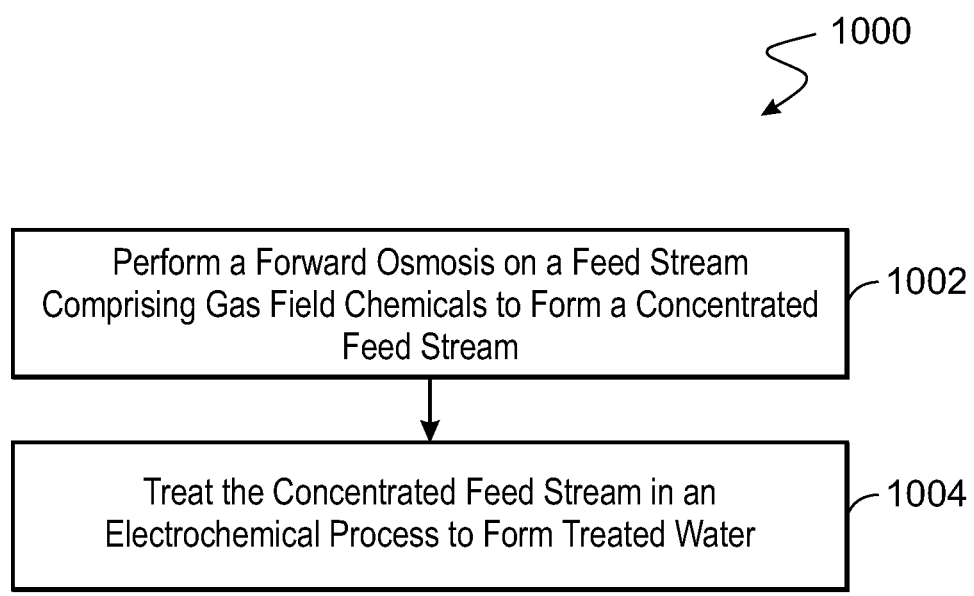
FIG. 10 is a process flow diagram of a method for removing hydrate inhibitors and other gas field chemicals from a feed stream.

FIG. 10 is a process flow diagram of a method 1000 for removing hydrate inhibitors and other gas field chemicals from a feed stream. The method begins at block 1002 with the performance of a forward osmosis process on the feed stream that includes the gas field chemicals, forming a concentrated feed stream. As described herein, the gas field chemicals can include kinetic hydrate inhibitors, other hydrate inhibitors, corrosion inhibitors, and the like. The feed stream can be a water stream separated from a gas stream in a gas collection system, a pipeline to a gas plant, and the like. The kinetic hydrate inhibitor can be added at the wellhead to prevent the formation of hydrates from the entrained water in the gas stream.

At block 1004, the concentrated feed stream from the forward osmosis process is fed to an electrochemical process to form a treated water stream. As described herein, in the electrochemical process, an electric current passing through the concentrated feed stream may purify the stream through several processes. These processes include flotation of impurities with hydrogen bubbles formed by electrolysis, the electrocoagulation of impurities with metal ions released from a sacrificial anode, and the direct electrooxidation or electroreduction of impurities.

Figure 11:
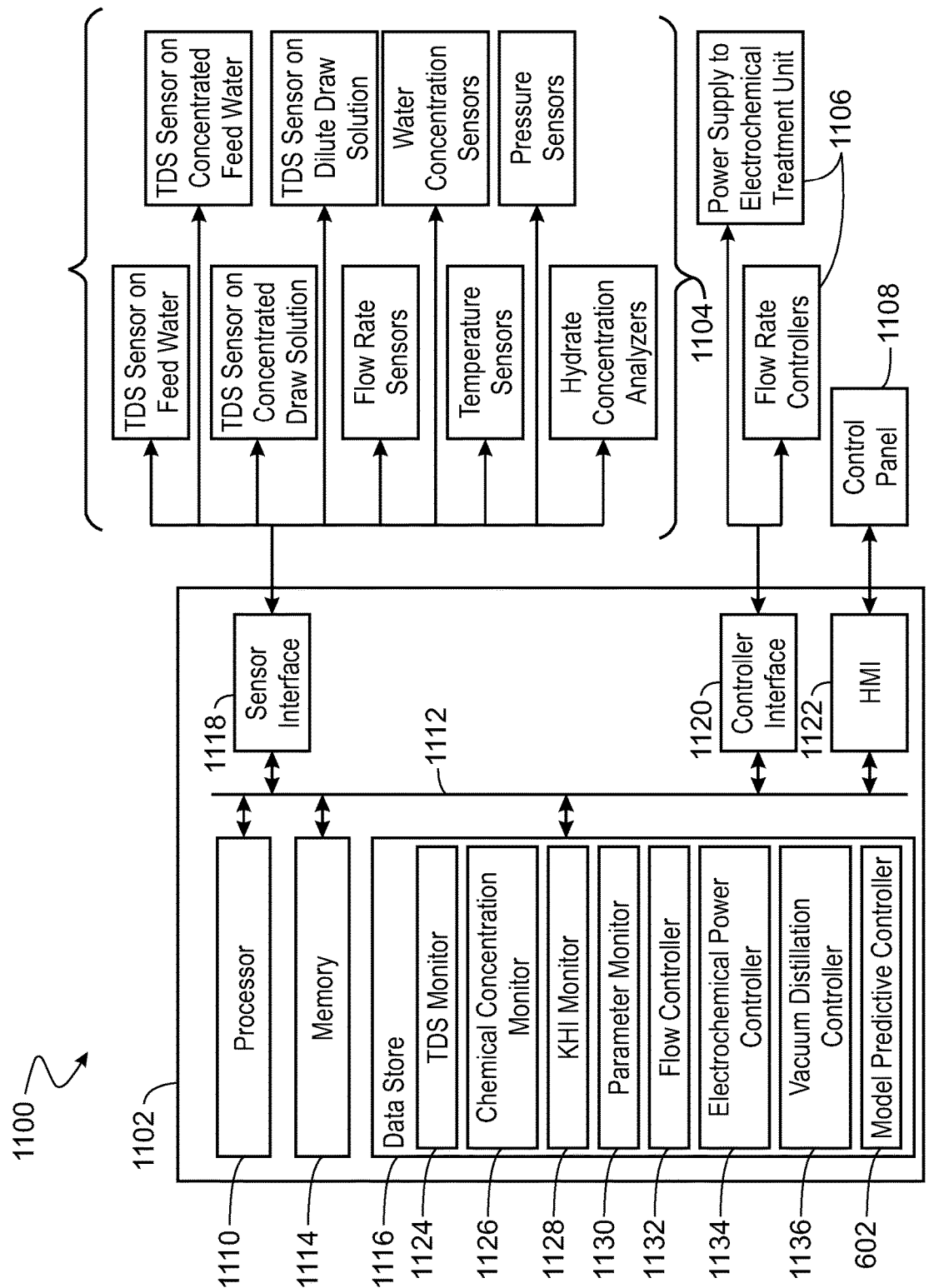
FIG. 11 is a block diagram of a control system includes a controller to implement a model predictive controller, as described with respect to FIGS. 6 and 10.

FIG. 11 is a block diagram of a control system 1100 includes a controller to implement a model predictive controller, as described with respect to FIGS. 6 and 10. Like numbered items are as described with respect to FIG. 6. The control system 1100 includes a controller 1102, sensors 1104, actuators 1106, and a control panel 1108 for reporting operations and getting inputs from operators. In some embodiments, the controller 1102 is a microcontroller, for example, mounted in the enclosure with the control panel 1108. In other embodiments, the controller 1102 is a virtual controller running on a processor in a DCS, on a virtual processor in a cloud server, or using other real or virtual processors.

The controller 1102 includes a processor 1110. The processor 1110 may be a microprocessor, a multi-core processor, a multithreaded processor, an ultra-low-voltage processor, an embedded processor, or a virtual processor. In some embodiments, the processor 1110 may be part of a distributed control system (DCS), in which the processor 1110 is either a real processor or a virtual processor. In various embodiments, the processor 1110 may include processors from Intel® Corporation of Santa Clara, California, from Advanced Micro Devices, Inc. (AMD) of Sunnyvale, California, or from ARM Holdings, LTD., Of Cambridge, England. Any number of other processors from other suppliers may also be used.

The processor 1110 may communicate with other components of the controller 1102 over a bus 1112. The bus 1112 may include any number of technologies, such as industry standard architecture (ISA), extended ISA (EISA), peripheral component interconnect (PCI), peripheral component interconnect extended (PCIx), PCI express (PCIe), or any number of other technologies. The bus 1112 may be a proprietary bus, for example, used in a DCS system. Other bus technologies may be used, in addition to, or instead of, the technologies above.

The bus 1112 may couple the processor 1110 to a memory 1114. In some embodiments, such as in programmable logic controllers (PLCs) and other process control units, the memory 1114 is integrated with a data store 1116 used for long-term storage of programs and data. The memory 1114 includes any number of volatile and nonvolatile memory devices, such as volatile random-access memory (RAM), static random-access memory (SRAM), flash memory, and the like. In smaller devices, such as PLCs, the memory 1114 may include registers associated with the processor itself. The data store 1116 is used for the persistent storage of information, such as data, applications, operating systems, and so forth. The data store 1116 may be a nonvolatile RAM, a solid-state disk drive, or a flash drive, among others. In some embodiments, the data store 1116 will include a hard disk drive, such as a micro hard disk drive, a regular hard disk drive, or an array of hard disk drives, for example, associated with a DCS or a cloud server.

The bus 1110 couples the processor 1110 to a sensor interface 1118. The sensor interface 1118 connects the controller 1102 to the sensors 1104 used to monitor the forward osmosis and chemical degradation procedures, such as the electrochemical degradation or the ozonolysis. In some embodiments, the sensor interface 1118 is a bank of analog-to-digital converters (ADCs), an $I^2C$ bus, a serial peripheral interface (SPI) bus, or a Fieldbus®, and the like. The sensors 1104 include total dissolved solids sensors, flow rate sensors, water concentration sensors, temperature sensors, pressure sensors, and hydrate concentration analyzers, for example, as described with respect to the previous figures.

The bus 1112 may couple the processor 1110 to a controller interface 1120. In some embodiments, the controller interface 1120 is a bank of relays, a bank of MOSFET power controllers, a serial peripheral interface (SPI), or a Fieldbus, and the like. The controller interface 1120 couples the controller 1102 to the actuators 1106 used to control the process. For example, the actuators 1106 may include flow rate controllers and the power supplied to the electrochemical treatment unit. Other actuators 1106 that can be used in embodiments include an ozone generator, a vacuum compressor, and the like.

The bus 1112 couples the processor 1110 to a human machine interface (HMI) 1122. The HMI 1122 couples the controller 1102 to a control panel 1108. As discussed herein, in some embodiments, the controller 1102 is part of a DCS or control system that controls an entire plant or refinery. In those embodiments, the control panel 1108 includes the screens and keyboards used to control the plant through the DCS.

The data store 1116 includes blocks of stored instructions that, when executed, direct the processor 1110 to implement the functions of the controller 1102. For example, the data store 1116 includes a block 1124 of instructions to direct the processor 1110 to monitor the total dissolved solids in each of the flow streams, as described herein. The data store 1116 also includes a block 1126 of instructions to direct the processor 1110 to monitor the chemical concentration, for example, using the water concentration analyzers. The data store 1116 includes a block 1128 of instructions to direct the processor 1110 to monitor the KHI concentration, and other chemical concentrations, using the hydrate concentration analyzers. The data store also includes a block 1130 of instructions to direct the processor 1110 to monitor the physical properties of the system, including the flow rates, temperatures, and pressures of lines and vessels, as shown with respect to FIGS. 6 and 10.

The data store 1116 includes a block 1132 of instructions to direct the processor 1110 to control the flow rates of solutions in the system, such as the concentrated draw solution, the feed solution, the dilute draw solution, the concentrated feed solution, and the like. The data store 1116 also includes a block 1134 of instructions to direct the processor 1110 to control the power to the electrochemical purification unit. In various embodiments, a block 1136 of instructions is included to direct the processor 1110 to control a vacuum distillation column, for example, increasing or decreasing the pressure in a vacuum distillation column to control the concentration of the concentrated feed water coming from the column.

The data store 1116 also includes a block 602 of instructions that implement the model predictive controller. The model predictive controller is described further with respect to FIGS. 6 and 10.

Embodiments

An embodiment described by examples herein provides a method for removing gas field chemicals from a feed stream. The method includes performing a forward osmosis on a feed stream including gas field chemicals to form a concentrated feed stream, and treating the concentrated feed stream in an electrochemical process to form treated water.

In an aspect, the gas field chemicals include a kinetic hydrate inhibitor (KHI).

In an aspect, the gas field chemicals include a hydrate inhibitor, a hydrocarbon, a corrosion inhibitor, or any combinations thereof.

In an aspect, the method includes using a produced water from a gas oil separation plant as the concentrated draw solution in the forward osmosis forming a dilute draw solution.

In an aspect, the method includes injecting the dilute draw solution into an injection well.

In an aspect, the method includes using a solution with a high osmotic pressure as a concentrated draw solution in the forward osmosis forming a dilute draw solution, and regenerating the dilute draw solution to reform the concentrated draw solution and a purified water stream. In an aspect, the method includes distilling the dilute draw solution to remove water and form the concentrated draw solution and the purified water stream. In an aspect, the method includes treating the dilute draw solution with nitrogen to change the polarity of a solvent to form the concentrated draw solution and the purified water stream. In an aspect, the method includes performing reverse osmosis on the dilute draw stream to form the concentrated draw solution and the purified water stream. In an aspect, the method includes using the purified water stream in a desalting process in a gas oil separation plant. In an aspect, the method includes using the purified water stream as wash water in a gas-oil separation plant.

In an aspect, the method includes performing a distillation on the concentrated feed stream to form a more concentrated feed stream, and treating the more concentrated feed stream in the electrochemical process to form the treated water.

In an aspect, the method includes using vibrationally assisted forward osmosis.

In an aspect, the electrochemical process includes electrocoagulation.

In an aspect, the electrochemical process includes electrochemical oxidation.

In an aspect, the method includes performing ozone-activated degradation of the concentrated feed water.

Another embodiment described by examples herein provides a system for removing hydrate inhibitors from produced water. The system includes a forward osmosis (FO) unit that includes a concentrated draw solution feed, a dilute draw solution effluent, a water feed, a concentrated water effluent, and a semipermeable membrane separating the water feed from the concentrated draw solution feed. The system includes an electrochemical purification unit to form a treated water effluent from the concentrated water effluent, and a control system.

In an aspect, the system includes a draw solution regenerator. The draw solution regenerator includes the dilute draw solution feed from the FO unit, a draw solution regenerator, a concentrated draw solution effluent to the FO unit, and a purified water effluent.

In an aspect, the semipermeable membrane allows water to pass while blocking solutes.

In an aspect, the system includes a distillation column. The distillation column includes a concentrated water feed from the forward osmosis unit, and a bottoms feed to the electrochemical purification unit.

In an aspect, the electrochemical purification unit includes an electrocoagulation system. In an aspect, the electrochemical purification unit includes an electro-oxidation system. In an aspect, the electrochemical purification unit includes a combined electrocoagulation and electro-oxidation system.

In an aspect, the control system includes sensors that include total dissolved solids (TDS) sensors on inlet and outlet lines to the FO unit, flow rate (FR) sensors on inlet and outlet lines to the FO unit, a water concentration (WC) sensor on the concentrated water effluent from the FO unit, and a hydrate inhibitor concentration sensor on the treated water effluent from the electrochemical purification unit. The control system also includes actuators that include a flow controller on the produced water feed to the FO unit, a flow controller on the concentrated draw solution feed to the FO unit, and a power controller on a power supply to the electrochemical purification unit. Further the control system includes a processor configured to execute instructions in a machine readable medium, wherein the machine readable medium, including instructions that, when executed, direct the processor to monitor the TDS sensor on the produced water feed to the FO unit and the TDS sensor on the concentrated water effluent from the FO unit to determine any ingress of salts across the membrane, and monitor the hydrate inhibitor concentration sensor and adjust the flow rate of the concentrated draw solution feed to the FO unit.

In an aspect, the TDS sensors include a total dissolved solids (TDS) sensor on the concentrated draw solution feed to the forward osmosis unit, a TDS sensor on the dilute draw solution effluent from the FO unit, and a TDS sensor on the concentrated water effluent from the FO unit.

In an aspect, the FR sensors include a flow rate (FR) sensor on the concentrated draw solution feed to the FO unit, an FR sensor on the dilute draw solution effluent from the FO unit, an FR sensor on the produced water feed to the FO unit, and an FR sensor on the concentrated water effluent from the FO unit.

Other implementations are also within the scope of the following claims.

What is claimed is:

1. A method for removing gas field chemicals from a feed stream, comprising:
   performing a forward osmosis on a feed stream comprising gas field chemicals to form a concentrated feed stream, concentrated in the gas field chemicals, and a dilute draw solution; and
   treating the concentrated feed stream in an electrochemical process to form treated water.

2. The method of claim 1, wherein the gas field chemicals comprise a kinetic hydrate inhibitor (KHI).

3. The method of claim 1, wherein the gas field chemicals comprise a hydrate inhibitor, a hydrocarbon, or a corrosion inhibitor.

4. The method of claim 1, comprising using a produced water from a gas oil separation plant as a concentrated draw solution in the forward osmosis for forming the dilute draw solution.

5. The method of claim 4, comprising injecting the dilute draw solution into an injection well.

6. The method of claim 1, comprising:
   using a solution with osmotic pressure as a concentrated draw solution in the forward osmosis for forming the dilute draw solution; and
   regenerating the dilute draw solution to reform the concentrated draw solution and a purified water stream.

7. The method of claim 6, comprising distilling the dilute draw solution to remove water and form the concentrated draw solution and the pure water stream.

8. The method of claim 6, comprising treating the dilute draw solution with nitrogen to change the polarity of a solvent to form the concentrated draw solution and the pure water stream.

9. The method of claim 6, comprising performing reverse osmosis on the dilute draw stream to form the concentrated draw solution and the pure water stream.

10. The method of claim 6, comprising using the purified water stream in a desalting process in a gas-oil separation plant.

11. The method of claim 6, comprising using the purified water stream as wash water in a gas-oil separation plant.

12. The method of claim 1, comprising:
    performing a distillation on the concentrated feed stream to form a more concentrated feed stream; and
    treating the more concentrated feed stream in the electrochemical process to form the treated water.

13. The method of claim 1, wherein the forward osmosis is vibrationally assisted.

14. The method of claim 1, wherein the electrochemical process comprises electrocoagulation.

15. The method of claim 1, wherein the electrochemical process comprises electrochemical oxidation.

16. The method of claim 1, comprising performing ozone activated degradation of the concentrated feed stream.

17. A system for removing hydrate inhibitors from produced water, comprising:
    a forward osmosis (FO) unit configured to receive a concentrated draw solution feed, discharge a dilute draw solution effluent, receive a water feed and discharge a concentrated water effluent, wherein the FO unit comprises a semipermeable membrane separating the water feed from the concentrated draw solution feed; and
    an electrochemical purification unit to form a treated water effluent from the concentrated water effluent; and
    a control system configured to:
    monitor total dissolved solids (TDS) on the water feed and TDS on the concentrated water effluent to determine any ingress of salts across the membrane, and
    adjust a flow rate of the concentrated draw solution feed to the FO unit based on the monitored TDS on the water feed and the TDS on the concentrated water effluent.

18. The system of claim 17, comprising a draw solution regenerator connected to the FO unit, wherein the draw solution regenerator is configured to receive the dilute draw solution effluent from the FO unit to form a concentrated draw solution effluent to discharge to the FO unit, and a purified water effluent.

19. The system of claim 17, wherein the semipermeable membrane allows water to pass while blocking solutes.

20. The system of claim 17, comprising a distillation column configured to a receive the concentrated water effluent from the forward osmosis unit, and to discharge a bottoms feed from the distillation column to the electrochemical purification unit.

21. The system of claim 17, wherein the electrochemical purification unit comprises an electrocoagulation system.

22. The system of claim 17, wherein the electrochemical purification unit comprises an electro-oxidation system.

23. The system of claim 17, wherein the electrochemical purification unit comprises a combined electrocoagulation and electro-oxidation system.

24. The system of claim 17, wherein the FO unit comprises inlet and outlet lines, wherein the control system comprises:

sensors comprising: TDS sensors on the inlet and outlet lines to the FO unit;
flow rate (FR) sensors on the inlet and outlet lines to the FO unit;
a water concentration (WC) sensor configured to measure water concentration of the concentrated water effluent from the FO unit; and
a hydrate inhibitor concentration sensor configured to measure hydrate inhibitor concentration of the treated water effluent from the electrochemical purification unit;
actuators comprising:
　a flow controller on the produced water feed to the FO unit; and
　a flow controller on the concentrated draw solution feed to the FO unit;
a power supply configured to supply power to the electrochemical purification;
a power controller on the power supply; and
a processor configured to execute instructions in a machine readable medium; and the machine readable medium, comprising instructions that, when executed, direct the processor to:
　monitor the TDS sensor on the produced water feed to the FO unit and the TDS sensor on the concentrated water effluent from the FO unit to determine the ingress of salts across the membrane; and
　monitor the hydrate inhibitor concentration sensor and adjust a flow rate of the concentrated draw solution feed to the FO unit.

25. The system of claim 24, wherein the TDS sensors comprise:
　a total dissolved solids (TDS) sensor on the concentrated draw solution feed to the forward osmosis unit;
　a TDS sensor on the dilute draw solution effluent from the FO unit; and
　a TDS sensor on the concentrated water effluent from the FO unit.

26. The system of claim 24, wherein the FR sensors comprise:
　a flow rate (FR) sensor on the concentrated draw solution feed to the FO unit;
　an FR sensor on the dilute draw solution effluent from the FO unit;
　an FR sensor on the produced water feed to the FO unit; and
　an FR sensor on the concentrated water effluent from the FO unit.

* * * * *